US012025039B2

(12) United States Patent
Sugihara et al.

(10) Patent No.: US 12,025,039 B2
(45) Date of Patent: Jul. 2, 2024

(54) V-TYPE ENGINE AND WORK MACHINE

(71) Applicant: HONDA MOTOR CO., LTD., Tokyo (JP)

(72) Inventors: Atsuki Sugihara, Saitama (JP); Sayaka Yasoshina, Saitama (JP); Atsushi Murao, Saitama (JP); Takahiro Tsuchiyama, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/549,522

(22) PCT Filed: Mar. 10, 2021

(86) PCT No.: PCT/JP2021/009502
§ 371 (c)(1),
(2) Date: Sep. 7, 2023

(87) PCT Pub. No.: WO2022/190250
PCT Pub. Date: Sep. 15, 2022

(65) Prior Publication Data
US 2024/0159181 A1 May 16, 2024

(51) Int. Cl.
*F01N 13/10* (2010.01)
*F01N 13/00* (2010.01)
*F02B 75/22* (2006.01)

(52) U.S. Cl.
CPC ............ *F01N 13/107* (2013.01); *F02B 75/22* (2013.01); *F01N 13/011* (2014.06)

(58) Field of Classification Search
CPC ....... F01N 13/107; F01N 13/011; F02B 75/22
See application file for complete search history.

(56) References Cited

U.S. PATENT DOCUMENTS

| | | | | |
|---|---|---|---|---|
| 5,657,625 | A * | 8/1997 | Koga | F02D 41/028 60/285 |
| 2021/0040903 | A1 * | 2/2021 | Ninomiya | F02D 41/0255 |

FOREIGN PATENT DOCUMENTS

| | | | | |
|---|---|---|---|---|
| JP | H0874598 | A | 3/1996 | |
| JP | 2006226187 | A | 8/2006 | |
| JP | 2007092663 | A | 4/2007 | |
| WO | WO-2015156203 | A1 * | 10/2015 | B63H 20/24 |

OTHER PUBLICATIONS

Written Opinion of the International Searching Authority for Japanese Patent Application PCT/JP2021/009502 mailed Apr. 27, 2021; 8 pp.

* cited by examiner

*Primary Examiner* — Ngoc T Nguyen
(74) *Attorney, Agent, or Firm* — Armstrong Teasdale LLP

(57) ABSTRACT

A V-type engine includes an engine body including a crankcase configured to rotatably support a crankshaft, and a first and second cylinder banks extending from the crankcase, an exhaust collecting pipe connected to the first and second cylinder banks, a catalyst accommodated in the exhaust collecting pipe, and a muffler detachably connected to the exhaust collecting pipe, wherein the catalyst extends in a width direction of the engine body from a distal end side of the first cylinder bank to a distal end side of the second cylinder bank.

9 Claims, 6 Drawing Sheets

V-TYPE ENGINE AND WORK MACHINE

CROSS-REFERENCE TO RELATED APPLICATION

This application is a U.S. national stage application of PCT/JP2021/009502, filed on Mar. 10, 2021, which is hereby expressly incorporated by reference in its entirety.

TECHNICAL FIELD

The present invention relates to a V-type engine and a work machine.

BACKGROUND ART

Conventionally, an engine is provided with an exhaust device for discharging an exhaust gas generated in a combustion process. The exhaust device includes an exhaust pipe through which the exhaust gas passes, a catalyst configured to purify the exhaust gas, a muffler configured to reduce an exhaust sound, and the like. For example, the exhaust gas generated in the combustion process passes through the exhaust pipe, the catalyst, and the muffler in this order, and is discharged outside the engine.

For example, Patent Document 1 discloses an exhaust purifying device for a V-type engine. The exhaust purifying device includes a front exhaust passage connected to a front bank, a rear exhaust passage connected to a rear bank, a primary exhaust passage connected to the front exhaust passage and the rear exhaust passage, a catalytic converter provided in the primary exhaust passage, and a catalyst provided in the catalytic converter.

PRIOR ART DOCUMENT(S)

Patent Document(s)

Patent Document 1: JP2006-226187A

SUMMARY OF THE INVENTION

Task to be Accomplished by the Invention

However, in Patent Document 1, the catalytic converter is away from the front bank and the rear bank. Accordingly, the V-type engine including the exhaust purifying device becomes larger. Further, in Patent Document 1, the catalyst is installed only in an upstream portion of the catalytic converter, so the length of the catalyst is short. Accordingly, it is difficult to improve the performance to purify the exhaust gas. Furthermore, in the exhaust purifying device as described above, a muffler may be fixed to the primary exhaust passage by welding or the like. However, adopting such a configuration reduces the flexibility for setting the muffler.

In view of the above background, an object of the present invention is to improve the flexibility for setting a muffler and sufficiently secure the length of a catalyst while making a V-type engine compact.

Means to Accomplish the Task

To achieve such an object, one aspect of the present invention provides a V-type engine (1), comprising: an engine body (3) including a crankcase (7) configured to rotatably support a crankshaft (11), and a first and second cylinder banks (8, 9) extending from the crankcase; an exhaust collecting pipe (31) connected to the first and second cylinder banks; a catalyst (32) accommodated in the exhaust collecting pipe; and a muffler (33) detachably connected to the exhaust collecting pipe, wherein the catalyst extends in a width direction of the engine body from a distal end side of the first cylinder bank to a distal end side of the second cylinder bank.

According to this aspect, the muffler is detachably connected to the exhaust collecting pipe, so that the user can set an appropriate muffler according to the configuration and the like of a work machine in which the V-type engine is installed. Accordingly, the flexibility for setting the muffler can be improved.

Further, the catalyst extends in the width direction of the engine body from the distal end side of the first cylinder bank to the distal end side of the second cylinder bank. Accordingly, the engine body and the catalyst are arranged compactly, so that the V-type engine can be made compact. Furthermore, the length of the catalyst can be sufficiently secured, so that the performance to purify an exhaust gas can be improved.

In the above aspect, preferably, the exhaust collecting pipe includes: a first exhaust pipe (41) connected to the first cylinder bank; a second exhaust pipe (42) connected to the second cylinder bank; and a merging pipe (43) connected to a merging portion (M) of the first and second exhaust pipes, and the catalyst is accommodated in the merging pipe.

According to this aspect, the number of catalysts can be reduced as compared with a case where the catalysts are accommodated in each of the first and second exhaust pipes. Accordingly, the configuration of the V-type engine can be simplified.

In the above aspect, preferably, the merging pipe includes: an inlet pipe (51) connected to the merging portion of the first and second exhaust pipes on a lateral side of the first cylinder bank and extending so as to protrude outward in the width direction of the engine body; and an accommodating pipe (52) connected to the inlet pipe on the distal end side of the first cylinder bank and extending in the width direction of the engine body from the distal end side of the first cylinder bank to the distal end side of the second cylinder bank, and the catalyst is accommodated in the accommodating pipe.

According to this aspect, the length of the catalyst can be sufficiently secured while the structure of the merging pipe is made as simple as possible.

In the above aspect, preferably, an upstream portion (51*a*) in an exhaust direction of the inlet pipe is formed of a pipe having an undivided structure, and a downstream portion (51*b*) in the exhaust direction of the inlet pipe is formed of a pipe having a divided structure.

According to this aspect, the upstream portion of the inlet pipe is formed of a pipe having an undivided structure. Accordingly, the manufacturing cost of the exhaust collecting pipe can be lower as compared with a case where the entire inlet pipe is formed of a pipe having a divided structure. Further, the downstream portion of the inlet pipe is formed of a pipe having a divided structure. Accordingly, the radius of curvature of the downstream portion of the inlet pipe can be made smaller as compared with a case where the downstream portion of the inlet pipe is formed of a pipe having an undivided structure. Accordingly, the layout of the inlet pipe is optimized, so that the exhaust collecting pipe can be made compact. Furthermore, the inner diameter of the downstream portion of the inlet pipe changes smoothly, so that the exhaust gas can hit against the entire catalyst in good balance. Accordingly, the performance to purify the exhaust gas by the catalyst can be improved.

In the above aspect, preferably, the merging pipe further includes an outlet pipe (53) connected to the accommodating pipe on the distal end side of the second cylinder bank and extending so as to protrude outward in the width direction of the engine body and toward an opposite side of the inlet pipe, and the muffler is detachably connected to the outlet pipe.

According to this aspect, the engine body, the exhaust collecting pipe, the catalyst, and the muffler can be arranged compactly while the configuration of the merging pipe is made as simple as possible.

In the above aspect, preferably, an upstream portion (53*a*) in an exhaust direction of the outlet pipe is formed of a pipe having a divided structure, and a downstream portion (53*b*) in the exhaust direction of the outlet pipe is formed of a pipe having an undivided structure.

According to this aspect, the downstream portion of the outlet pipe is formed of a pipe having an undivided structure. Accordingly, the manufacturing cost of the exhaust collecting pipe can be lower as compared with a case where the entire outlet pipe is formed of a pipe having a divided structure. Further, the upstream portion of the outlet pipe is formed of a pipe having a divided structure. Accordingly, the radius of curvature of the upstream portion of the outlet pipe can be made smaller as compared with a case where the upstream portion of the outlet pipe is formed of a pipe having an undivided structure. Accordingly, the layout of the outlet pipe is optimized, so that the exhaust collecting pipe can be made even more compact. Furthermore, the inner diameter of the upstream portion of the outlet pipe changes smoothly, so that a pressure drop can be reduced.

In the above aspect, preferably, the muffler is fixed to each of the first and second cylinder banks via a pair of fixed stays (105), and the merging pipe is connected to each of the pair of fixed stays via a pair of connecting stays (34).

According to this aspect, as compared with a case where the merging pipe is fixed to each of the first and second cylinder banks via the pair of connecting stays, the length of the pair of connecting stays can be shortened.

In the above aspect, preferably, the merging pipe is fixed to each of the first and second cylinder banks via a pair of connecting stays (34).

According to this aspect, the merging pipe can be fixed to the first and second cylinder banks without using a structure to fix the muffler. Accordingly, the muffler can be arranged at any position, and the flexibility for setting the muffler can be improved.

In the above aspect, preferably, the muffler includes a muffler body (94) having a muffling chamber (111 to 113), and the muffler body extends in the width direction of the engine body from the distal end side of the first cylinder bank to the distal end side of the second cylinder bank.

According to this aspect, the muffler body is arranged parallel to the catalyst, so that the engine body, the catalyst, and the muffler can be arranged compactly.

In the above aspect, preferably, an output portion of the crankshaft protrudes from a side surface (7*a*) of the crankcase, and the catalyst protrudes more sideward than the side surface of the crankcase.

According to this aspect, the catalyst can protrude in the same direction as the output portion of the crankshaft. Accordingly, the layout of other parts is less likely to be restricted by the catalyst.

To achieve such an object, another aspect of the present invention provides a work machine (P) comprising the V-type engine.

According to this aspect, it is possible to improve the flexibility for setting a muffler and sufficiently secure the length of a catalyst while making a work machine compact.

Effect of the Invention

Thus, according to the above aspects, it is possible to improve the flexibility for setting a muffler and sufficiently secure the length of a catalyst while making a V-type engine compact.

BRIEF DESCRIPTION OF THE DRAWING(S)

MODE(S) FOR CARRYING OUT THE INVENTION

<V-Type Engine 1>

Figure 1:
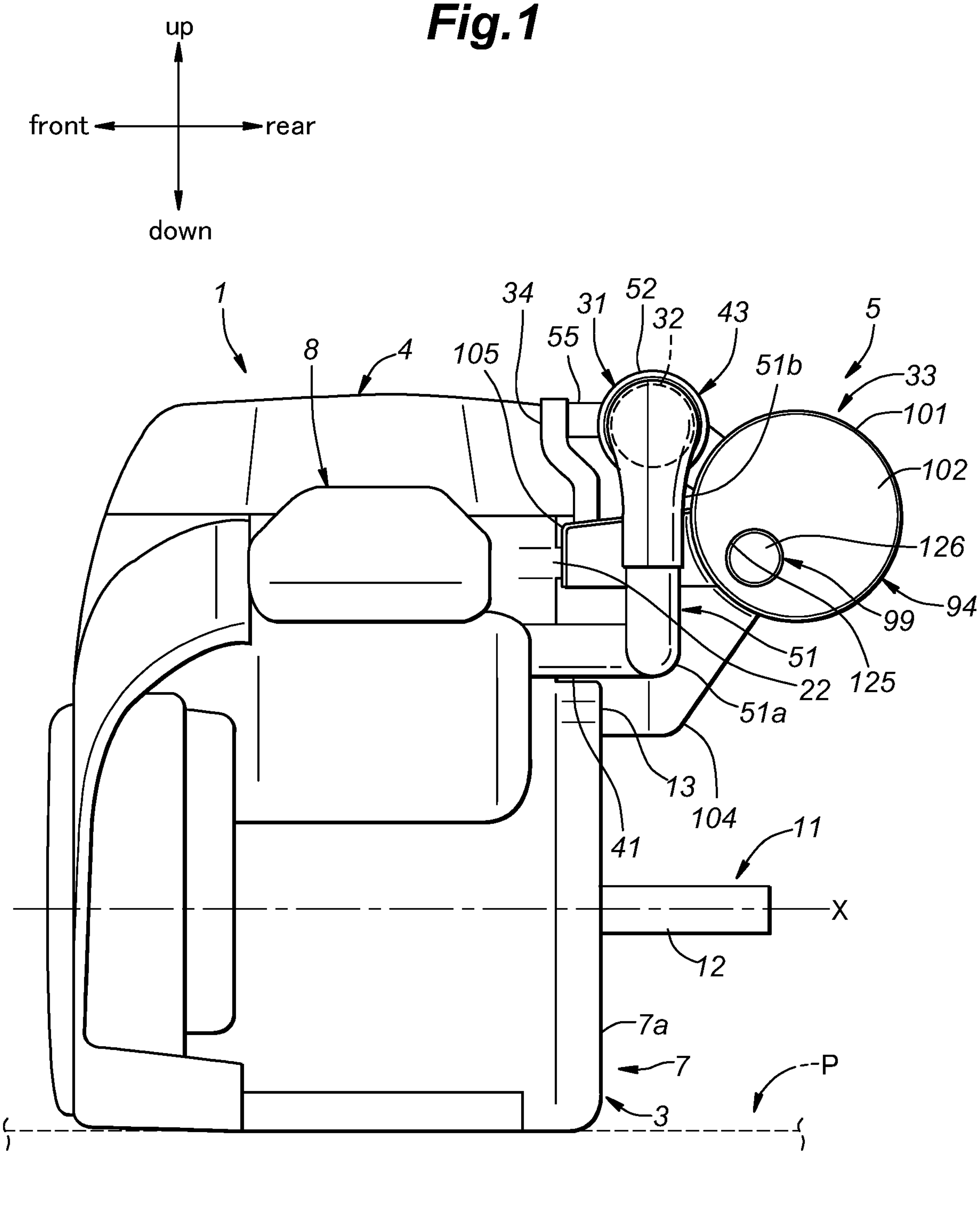
FIG. 1 is a side view showing a V-type engine according to an embodiment of the present invention.

In the following, a V-type engine 1 (hereinafter abbreviated as "engine 1") as an internal combustion engine according to an embodiment of the present invention will be described with reference to FIGS. 1 to 5. Hereinafter, for convenience of explanation, a left side in FIG. 1 is defined as a front side of the engine 1. Further, in this specification, when an expression like "fixed by bolt(s) (not shown)" is used, a member may be fixed by normal bolt(s) having a screw on only one side or by stud bolt(s) having screws on both sides.

With reference to FIG. 1, the engine 1 consists of a general-purpose engine used as a power source of a work machine P. For example, the work machine P consists of a cutting machine such as a concrete cutter, a floor treatment machine such as a floor leveler, a high-pressure washer, a generator, or the like. The engine 1 consists of an OHV air-cooled engine including two cylinders. In another embodiment, the engine 1 may consist of an engine (for example, an OHC engine) other than an OHV engine, an engine (for example, a water-cooled engine) other than an air-cooled engine, or an engine including three or more cylinders.

Figure 2:
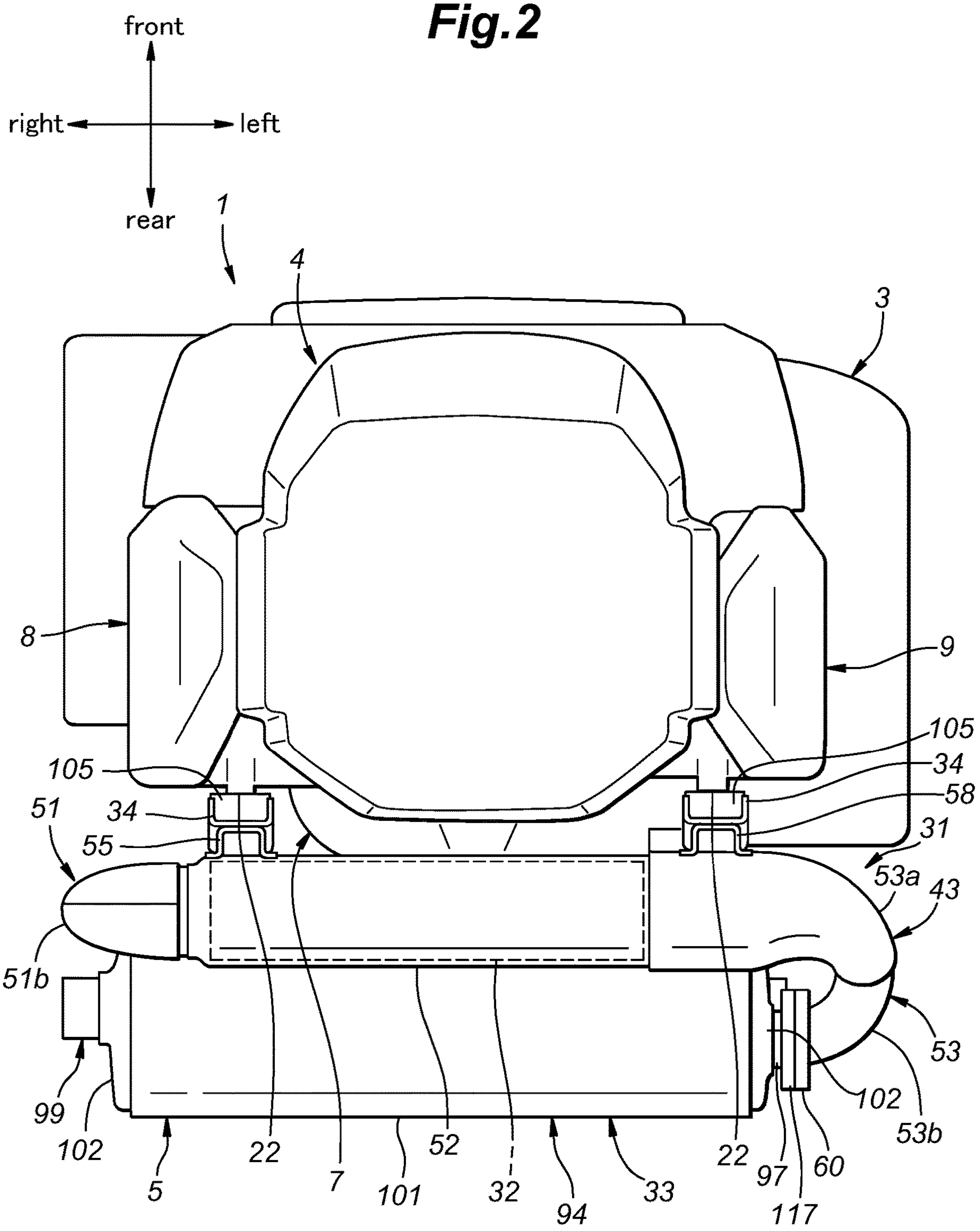
FIG. 2 is a plan view showing the V-type engine according to the embodiment of the present invention.
Figure 3:
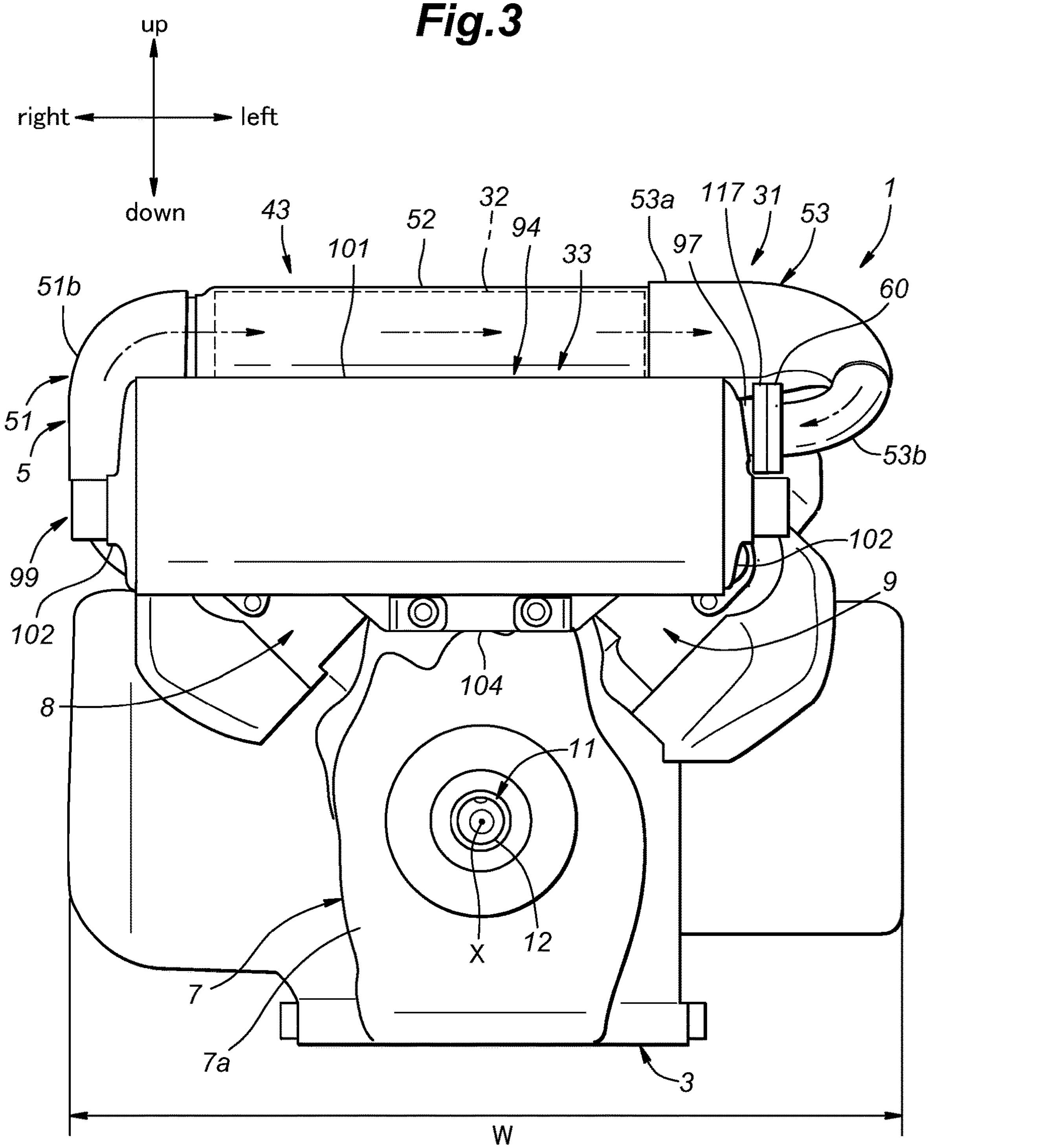
FIG. 3 is a rear view showing the V-type engine according to the embodiment of the present invention.

With reference to FIGS. 1 to 3, the engine 1 includes an engine body 3, an air cleaner 4 arranged above the engine body 3, and an exhaust device 5 arranged on an upper rear side of the engine body 3. In the following, these components of the engine 1 will be described in order.

<Engine Body 3>

Figure 4:
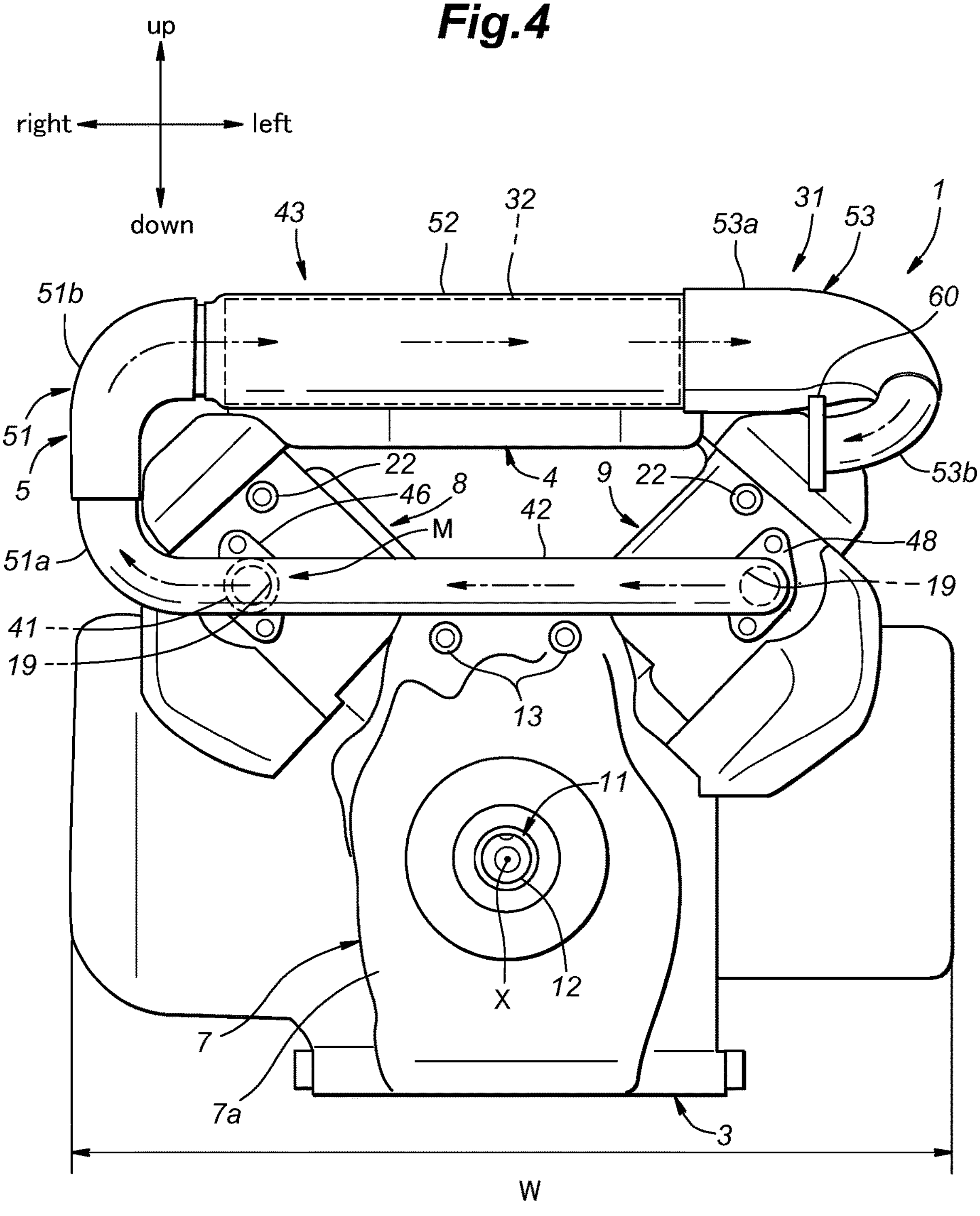
FIG. 4 is a rear view showing the V-type engine from which a muffler is removed according to the embodiment of the present invention.

With reference to FIG. 4, the engine body 3 includes a crankcase 7, a first cylinder bank 8 extending to an upper right side from the crankcase 7, and a second cylinder bank 9 extending to an upper left side from the crankcase 7.

With reference to FIGS. 1 and 4, a crankshaft 11 is rotatably supported by a central portion of the crankcase 7. The crankshaft 11 is configured to rotate around a rotation axis X extending in the front-and-rear direction. That is, the engine 1 consists of a horizontal engine in which the rotation axis X of the crankshaft 11 extends in the horizontal direction. In another embodiment, the engine 1 may consist of a vertical engine in which the rotation axis X of the crankshaft 11 extends in the up-and-down direction. In such a case, for example, the work machine P is a riding-type lawn mower. A power take-off shaft 12 (PTO shaft: an example of an output portion) is provided at a rear end of the crankshaft 11. The PTO shaft 12 is connected to a work unit of the work machine P (for example, a blade of the concrete cutter), and the work unit of the work machine P is configured to rotate according to the rotation of the PTO shaft 12. The PTO shaft 12 protrudes rearward from a rear surface 7*a* (one side surface) of the crankcase 7 and extends in the front-and-rear direction. A pair of left and right first fixed bosses 13 are provided on an upper portion of the rear surface 7*a* of the crankcase 7.

With reference to FIG. 4, the first and second cylinder banks 8, 9 are aligned in the lateral direction (the width direction of the engine body 3). Each of the first and second cylinder banks 8, 9, is provided diagonally above the crankcase 7.

In a lower portion (cylinder) of each of the first and second cylinder banks 8, 9, a piston (not shown) is accommodated so as to reciprocate. The piston is connected to the crankshaft 11 via a connecting rod (not shown).

An upper portion (cylinder head) of each of the first and second cylinder banks 8, 9 defines a combustion chamber (not shown) together with the piston. On a laterally inner surface of the upper portion of each of the first and second cylinder banks 8, 9, an intake port (not shown) communicating with the combustion chamber opens. On a rear surface of the upper portion of each of the first and second cylinder banks 8, 9, an exhaust port 19 communicating with the combustion chamber opens. On the rear surface of the upper portion of each of the first and second cylinder banks 8, 9, a second fixed boss 22 is provided above the exhaust port 19.

<Air Cleaner 4>

With reference to FIGS. 1 and 2, the air cleaner 4 has a flat shape (flat plate-like shape) elongated in the lateral direction and the front-and-rear direction. In another embodiment, the air cleaner 4 may have a cylindrical shape (canister-like shape). The air cleaner 4 is arranged between the first and second cylinder banks 8, 9 of the engine body 3. The air cleaner 4 is connected to the intake port (not shown) of each of the first and second cylinder banks 8, 9 via an intake pipe (not shown), and thus the air cleaned by the air cleaner 4 is introduced into the combustion chamber (not shown) via the intake port.

<Exhaust Device 5>

The exhaust device 5 is a device configured to discharge the exhaust gas discharged from the engine body 3 to an outside of the engine 1. Hereinafter, an expression "upstream" and an expression "downstream" indicate "upstream" and "downstream" in an exhaust direction (namely, a direction in which the exhaust gas flows inside the exhaust device 5), respectively. One-dot chain line arrows appropriately attached to each figure indicate the exhaust direction. Hereinafter, the description "extends in the lateral direction from the upper end side (distal end side) of the first cylinder bank 8 to the upper end side (distal end side) of the second cylinder bank 9" means that a component of the exhaust device 5 extends in the lateral direction at least from the upper end side (distal end side) of the first cylinder bank 8 to the upper end side (distal end side) of the second cylinder bank 9, and does not preclude the above-mentioned component from having a length longer than the above-mentioned layout.

With reference to FIGS. 1 to 3, the exhaust device 5 includes an exhaust collecting pipe 31, a catalyst 32, a muffler 33, and a pair of left and right connecting stays 34. Hereinafter, the components of the exhaust device 5 will be described in order.

<Exhaust Collecting Pipe 31>

With reference to FIG. 4, the exhaust collecting pipe 31 of the exhaust device 5 is arranged within a width W of the engine body 3 when viewed in the front-and-rear direction (the axial direction of the crankshaft 11). In the present embodiment, the inner diameter of a portion of the exhaust collecting pipe 31 is smaller than the outer diameter of the catalyst 32. In another embodiment, the inner diameter of the entire exhaust collecting pipe 31 may be equal to or larger than the outer diameter of the catalyst 32. By adopting such a configuration, it is possible to suppress the decrease in the output of the engine 1 due to a pressure drop.

The exhaust collecting pipe 31 includes a first exhaust pipe 41, a second exhaust pipe 42, and a merging pipe 43.

With reference to FIGS. 1 and 4, the first exhaust pipe 41 of the exhaust collecting pipe 31 extends in the front-and-rear direction. A first fixed flange 46 is provided on an outer circumference of a front end (upstream end) of the first exhaust pipe 41. The first fixed flange 46 is fixed around the exhaust port 19 of the first cylinder bank 8 by a pair of bolts (not shown). Thus, the front end of the first exhaust pipe 41 is connected to the exhaust port 19 of the first cylinder bank 8.

With reference to FIG. 4, the second exhaust pipe 42 of the exhaust collecting pipe 31 extends in the lateral direction. A second fixed flange 48 is provided on an outer circumference of a left end (upstream end) of the second exhaust pipe 42. The second fixed flange 48 is fixed around the exhaust port 19 of the second cylinder bank 9 by a pair of bolts (not shown). Thus, the left end of the second exhaust pipe 42 is connected to the exhaust port 19 of the second cylinder bank 9. A right end (downstream end) of the second exhaust pipe 42 merges with a rear end (downstream end) of the first exhaust pipe 41 at a merging portion M arranged on a rear side (lateral side) of the first cylinder bank 8.

With reference to FIG. 4, the merging pipe 43 of the exhaust collecting pipe 31 includes an inlet pipe 51, an accommodating pipe 52, and an outlet pipe 53.

With reference to FIGS. 1 and 4, the inlet pipe 51 of the merging pipe 43 extends from a lower side to an upper side so as to protrude rightward (outward in the width direction of the engine body 3). The inlet pipe 51 is composed of an upstream portion 51*a*, and a downstream portion 51*b* arranged on an upper side (downstream side) of the upstream portion 51*a*.

The upstream portion 51*a* of the inlet pipe 51 is provided integrally with the second exhaust pipe 42 on an extension line of the second exhaust pipe 42. The upstream portion 51*a* is formed of a pipe having an undivided structure. The inner diameter of the entire upstream portion 51*a* is constant in the exhaust direction. A lower end (upstream end) of the upstream portion 51*a* is connected to the merging portion M of the first and second exhaust pipes 41, 42 on a rear side (lateral side) of the first cylinder bank 8.

The downstream portion 51*b* of the inlet pipe 51 is formed by joining a front portion and a rear portion. That is, the downstream portion 51*b* is formed of a pipe having a divided structure (divided hollow structure). The inner diameter of the upper portion of the downstream portion 51*b* gradually increases from a lower side (upstream side) to an upper side (downstream side). An oxygen sensor (not shown) is attached to the downstream portion 51*b*.

With reference to FIGS. 2 and 4, the accommodating pipe 52 of the merging pipe 43 extends in the lateral direction from the upper end side (distal end side) of the first cylinder bank 8 to the upper end side (distal end side) of the second cylinder bank 9. A right end (upstream end) of the accommodating pipe 52 is connected to the upper end (downstream end) of the downstream portion 51*b* of the inlet pipe 51 on the upper end side of the first cylinder bank 8. A fixed piece 55 protrudes forward from an outer circumferential surface of a right side portion of the accommodating pipe 52.

With reference to FIGS. 2 and 4, the outlet pipe 53 of the merging pipe 43 extends from a front upper side to a rear lower side so as to protrude leftward (outward in the width direction of the engine body 3). That is, the outlet pipe 53 extends so as to protrude toward an opposite side of the inlet pipe 51. The outlet pipe 53 is composed of an upstream portion 53*a*, and a downstream portion 53*b* arranged on a rear lower side (downstream side) of the upstream portion 53*a*.

The upstream portion 53*a* of the outlet pipe 53 is formed by joining an upper portion and a lower portion. That is, the upstream portion 53*a* is formed of a pipe having a divided structure (divided hollow structure). A right end (upstream end) of the upstream portion 53*a* is connected to a left end (downstream end) of the accommodating pipe 52 on the upper end side of the second cylinder bank 9. A fixed piece 58 protrudes forward from an outer circumferential surface of a right side portion of the upstream portion 53*a*. The inner diameter of a left side portion of the upstream portion 53*a* gradually decreases from a right side (upstream side) to a left side (downstream side).

The downstream portion 53*b* of the outlet pipe 53 is formed of a pipe having an undivided structure. The inner diameter of the entire downstream portion 53*b* is constant in the exhaust direction. A connecting flange 60 is provided at a right end (downstream end) of the downstream portion 53*b*.

<Catalyst 32>

The catalyst 32 of the exhaust device 5 consists of a ternary catalyst, for example. The catalyst 32 is configured to purify the exhaust gas by changing a harmful substance in the exhaust gas, which is discharged from the engine body 3 via the exhaust collecting pipe 31, into a harmless substance by a chemical reaction.

With reference to FIGS. 1 and 4, the catalyst 32 has a columnar shape elongated in the lateral direction. That is, in the present embodiment, the longitudinal direction of the catalyst 32 is the lateral direction. The catalyst 32 is accommodated in the accommodating pipe 52 of the merging pipe 43 of the exhaust collecting pipe 31. The catalyst 32 protrudes more rearward (sideward) than the rear surface 7*a* (side surface) of the crankcase 7. The catalyst 32 extends in the lateral direction from the upper end side (distal end side) of the first cylinder bank 8 to the upper end side (distal end side) of the second cylinder bank 9. When viewed in the front-and-rear direction, the catalyst 32 is arranged within the width W of the engine body 3, and overlaps with the air cleaner 4.

<Muffler 33>

Figure 5:
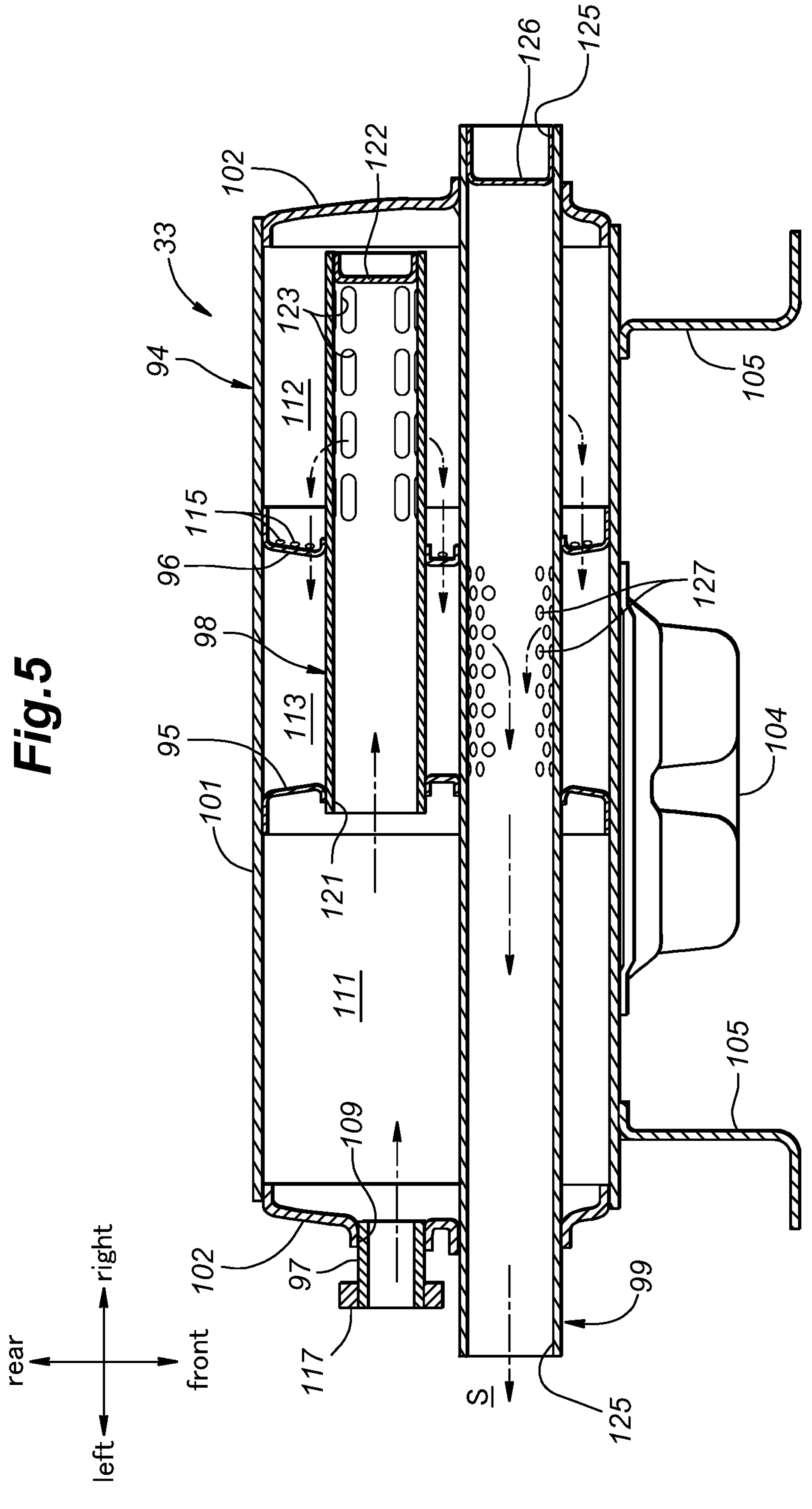
FIG. 5 is a cross-sectional view showing the muffler according to the embodiment of the present invention.

With reference to FIG. 3, the muffler 33 of the exhaust device 5 is arranged on a downstream side of the exhaust collecting pipe 31. The muffler 33 is not welded to the exhaust collecting pipe 31, and is detachably connected to the outlet pipe 53 of the merging pipe 43 of the exhaust collecting pipe 31. With reference to FIG. 5, the muffler 33 includes a muffler body 94, a plurality of partition walls 95, 96, an inflow pipe 97, a communication pipe 98, and a discharge pipe 99.

With reference to FIG. 1, the muffler body 94 is arranged adjacently to the accommodating pipe 52 of the merging pipe 43 on a rear lower side of the accommodating pipe 52 of the merging pipe 43. The muffler body 94 protrudes more rearward (sideward) than the rear surface 7*a* (side surface) of the crankcase 7.

With reference to FIGS. 2 and 3, the muffler body 94 is arranged parallel to the catalyst 32, and extends in the lateral direction from the upper end side (distal end side) of the first cylinder bank 8 to the upper end side (distal end side) of the second cylinder bank 9. When viewed in the front-and-rear direction, an upper portion of the muffler body 94 overlaps with a lower portion of the catalyst 32. When viewed in the front-and-rear direction, both lateral side portions of the muffler body 94 overlap with the upper portions of the first and second cylinder banks 8, 9. When viewed in the front-and-rear direction, the muffler body 94 is arranged within the width W of the engine body 3.

With reference to FIG. 5, the muffler body 94 has a cylindrical shape elongated in the lateral direction. That is, in the present embodiment, the longitudinal direction of the muffler body 94 is the lateral direction. In another embodiment, the muffler body 94 may have a shape (for example, a polygonal tubular shape) other than a cylindrical shape.

With reference to FIGS. 1, 2, and 5, the muffler body 94 includes a tubular portion 101 extending in the lateral direction, and a pair of lid portions 102 (left and right lid portions 102) covering openings at both lateral ends of the tubular portion 101. In a laterally central portion on an outer circumferential surface of the tubular portion 101, a fixed bracket 104 protrudes forward. The fixed bracket 104 is fixed to the pair of left and right first fixed bosses 13 of the crankcase 7 by a pair of bolts (not shown). In both lateral side portions of the outer circumferential surface of the tubular portion 101, a pair of left and right fixed stays 105 protrude forward. The right fixed stay 105 is fixed to the second fixed boss 22 of the first cylinder bank 8 by a bolt (not shown). The left fixed stay 105 is fixed to the second fixed boss 22 of the second cylinder bank 9 by a bolt (not shown).

With reference to FIG. 5, a plurality of muffling chambers 111 to 113 is formed inside the muffler body 94. The muffling chambers 111 to 113 include a first muffling chamber 111 formed at a left end of the muffler body 94, a second muffling chamber 112 formed at a right end of the muffler body 94, and a third muffling chamber 113 formed between the first muffling chamber 111 and the second muffling chamber 112. Volumes of the muffling chambers 111 to 113 become smaller in order of "a volume of the first muffling chamber 111, a volume of the second muffling chamber 112, and a volume of the third muffling chamber 113". That is, a formula "the volume of the first muffling chamber 111>the volume of the second muffling chamber 112>the volume of the third muffling chamber 113" is satisfied. An inflow port 109 of the exhaust gas is provided at a left end of the first muffling chamber 111. The inflow port 109 consists of a hole provided in the left lid portion 102.

The plurality of partition walls 95, 96 include a first partition wall 95 laterally partitioning the first muffling chamber 111 and the third muffling chamber 113, and a second partition wall 96 laterally partitioning the second muffling chamber 112 and the third muffling chamber 113. The second partition wall 96 is provided with multiple small holes 115 over the entire area thereof, and the second muffling chamber 112 and the third muffling chamber 113 communicate with each other via these multiple small holes 115.

With reference to FIGS. 3 and 5, the inflow pipe 97 is arranged on a left side (outside in the width direction of the engine body 3) of the muffler body 94. The inflow pipe 97 extends in the lateral direction. A connecting flange 117 is provided at a left end (upstream end) of the inflow pipe 97. The connecting flange 117 is fixed to the connecting flange 60 of the outlet pipe 53 of the merging pipe 43 by a pair of bolts (not shown). A right end (downstream end) of the inflow pipe 97 is connected to the inflow port 109 of the first muffling chamber 111 of the muffler body 94.

As shown in FIG. 5, the communication pipe 98 extends in the lateral direction. The communication pipe 98 penetrates the first and second partition walls 95, 96 to be supported by the first and second partition walls 95, 96. At a left end (upstream end) of the communication pipe 98, a communication port 121 communicating with the first muffling chamber 111 is provided. To a right end (downstream end) of the communication pipe 98, a cap 122 is fixed by welding. Accordingly, the right end of the communication pipe 98 is covered with the cap 122. On an outer circumferential portion of the communication pipe 98, multiple communication holes 123 communicating with the second muffling chamber 112 are provided. According to the above configuration, the first muffling chamber 111 and the second muffling chamber 112 communicate with each other via the communication pipe 98.

The discharge pipe 99 extends in the lateral direction. The discharge pipe 99 penetrates the pair of lid portions 102 of the muffler body 94 and the first and second partition walls 95, 96 to be supported by the pair of lid portions 102 of the muffler body 94 and the first and second partition walls 95, 96. On an outer circumferential portion of the discharge pipe 99, multiple outer circumferential holes 127 communicating with the third muffling chamber 113 are provided. The left and right ends of the discharge pipe 99 protrude to both lateral sides of the muffler body 94. At the left and right ends of the discharge pipe 99, a pair of openings 125 are formed. To the opening 125 formed at the right end of the discharge pipe 99, a lid member 126 is fixed by welding. Accordingly, the opening 125 formed at the right end of the discharge pipe 99 is closed by the lid member 126. The opening 125 formed at the left end of the discharge pipe 99 is not closed by a lid member 126, and communicates with an external space S on a left side of the muffler body 94. According to the above configuration, the third muffling chamber 113 and the external space S on the left side of the muffler body 94 communicate with each other via the discharge pipe 99. In another embodiment, the opening 125 formed at the left end of the discharge pipe 99 may be closed by the lid member 126, and the opening 125 formed at the right end of the discharge pipe 99 may be opened such that the third muffling chamber 113 and an external space on a right side of the muffler body 94 communicate with each other via the discharge pipe 99.

<A Pair of Left and Right Connecting Stays 34>

With reference to FIGS. 1 and 2, the pair of left and right connecting stays 34 extend in the up-and-down direction. An upper portion of the right connecting stay 34 is fixed to the fixed piece 55 of the accommodating pipe 52 of the merging pipe 43 by a bolt (not shown). A lower portion of the right connecting stay 34 is fixed to the right fixed stay 105 of the muffler body 94 by a bolt (not shown). An upper portion of the left connecting stay 34 is fixed to the fixed piece 58 of the outlet pipe 53 of the merging pipe 43 by a bolt (not shown). A lower portion of the left connecting stay 34 is fixed to the left fixed stay 105 of the muffler body 94 by a bolt (not shown).

<Flow of the Exhaust Gas>

With reference to FIG. 4, when the engine 1 is driven, the exhaust gas is discharged from the exhaust ports 19 of the first and second cylinder banks 8, 9. The exhaust gas discharged from the exhaust ports 19 passes through the first and second exhaust pipes 41, 42. Thereafter, the exhaust gas passes through the inlet pipe 51, the accommodating pipe 52, and the outlet pipe 53 of the merging pipe 43 in this order, and then is discharged from the outlet pipe 53 of the merging pipe 43. As described above, the exhaust gas passes through the accommodating pipe 52 of the merging pipe 43. Thus, the exhaust gas is purified by the catalyst 32 accommodated in the accommodating pipe 52 of the merging pipe 43.

As shown in FIG. 5, the exhaust gas discharged from the outlet pipe 53 of the merging pipe 43 flows into the inflow pipe 97 of the muffler 33. The exhaust gas that has flowed into the inflow pipe 97 passes through the inflow pipe 97, and then flows into the first muffling chamber 111 of the muffler 33 via the inflow port 109. The exhaust gas that has flowed into the first muffling chamber 111 passes through the first muffling chamber 111, and then flows into the communication pipe 98 of the muffler 33 via the communication port 121. The exhaust gas that has flowed into the communication pipe 98 passes through the communication pipe 98, and then flows into the second muffling chamber 112 of the muffler 33 via the multiple communication holes 123. The exhaust gas that has flowed into the second muffling chamber 112 passes through the second muffling chamber 112, and then flows into the third muffling chamber 113 of the muffler 33 via the multiple small holes 115 of the second partition wall 96. The exhaust gas that has flowed into the third muffling chamber 113 passes through the third muffling chamber 113, and then flows into the discharge pipe 99 of the muffler 33 via the multiple outer circumferential holes 127. The exhaust gas that has flowed into the discharge pipe 99 passes through the discharge pipe 99, and is then discharged from the opening 125 formed at the left end of the discharge pipe 99 to the external space S on the left side of the muffler body 94. In this way, the exhaust gas passes through the muffler 33, and thus the exhaust sound is reduced.

Effect

In the present embodiment, the muffler 33 is detachably connected to the outlet pipe 53 of the merging pipe 43 of the exhaust collecting pipe 31. By adopting such a configuration, the user can appropriately set the muffler 33 according to the configuration and the like of the work machine P in which the engine 1 is installed. Accordingly, the flexibility for setting the muffler 33 can be improved.

Further, the catalyst 32 extends in the lateral direction from the upper end side (distal end side) of the first cylinder bank 8 to the upper end side (distal end side) of the second cylinder bank 9. By adopting such a configuration, the engine body 3 and the catalyst 32 are arranged compactly, so that the engine 1 can be made compact. Furthermore, the length of the catalyst 32 can be sufficiently secured, so that the performance to purify the exhaust gas can be improved.

Further, the catalyst 32 is accommodated in the merging pipe 43. By adopting such a configuration, the number of catalysts 32 can be reduced as compared with a case where the catalysts 32 are accommodated in each of the first and second exhaust pipes 41, 42. Accordingly, the configuration of the engine 1 can be simplified.

Further, the merging pipe 43 includes the inlet pipe 51 extending so as to protrude rightward (outward in the width direction of the engine body 3), and the accommodating pipe 52 connected to the inlet pipe 51, and the catalyst 32 is accommodated in the accommodating pipe 52. By adopting such a configuration, the length of the catalyst 32 can be sufficiently secured while the configuration of the merging pipe 43 is made as simple as possible.

Further, the upstream portion 51*a* of the inlet pipe 51 is formed of a pipe having an undivided structure. By adopting such a configuration, the manufacturing cost of the exhaust collecting pipe 31 can be lower as compared with a case where the entire inlet pipe 51 is formed of a pipe having a divided structure.

Further, the downstream portion 51*b* of the inlet pipe 51 is formed of a pipe having a divided structure. By adopting such a configuration, the radius of curvature of the downstream portion 51*b* of the inlet pipe 51 can be made smaller as compared with a case where the downstream portion 51*b* of the inlet pipe 51 is formed of a pipe having an undivided structure. Accordingly, the layout of the inlet pipe 51 is optimized, so that the exhaust collecting pipe 31 can be made compact. Furthermore, the inner diameter of the downstream portion 51*b* of the inlet pipe 51 changes smoothly, so that the exhaust gas can hit against the entire catalyst 32 in good balance. Accordingly, the performance to purify the exhaust gas by the catalyst 32 can be improved.

Further, the outlet pipe 53 extends so as to protrude leftward (outward in the width direction of the engine body 3 and toward an opposite side of the inlet pipe 51), and the muffler 33 is detachably connected to the outlet pipe 53. By adopting such a configuration, the engine body 3, the exhaust collecting pipe 31, the catalyst 32, and the muffler 33 can be arranged compactly while the configuration of the merging pipe 43 is made as simple as possible.

Further, the upstream portion 53*a* of the outlet pipe 53 is formed of a pipe having a divided structure. By adopting such a configuration, the radius of curvature of the upstream portion 53*a* of the outlet pipe 53 can be made smaller as compared with a case where the upstream portion 53*a* of the outlet pipe 53 is formed of a pipe having an undivided structure. Accordingly, the layout of the outlet pipe 53 is optimized, so that the exhaust collecting pipe 31 can be made more compact. Furthermore, the inner diameter of the upstream portion 53*a* of the outlet pipe 53 changes smoothly, so that a pressure drop can be reduced.

Further, the downstream portion 53*b* of the outlet pipe 53 is formed of a pipe having an undivided structure. By adopting such a configuration, the manufacturing cost of the exhaust collecting pipe 31 can be lower as compared with a case where the entire outlet pipe 53 is formed of a pipe having a divided structure.

Further, the muffler body 94 is fixed to each of the first and second cylinder banks 8, 9 via the pair of fixed stays 105, and the pair of fixed pieces 55, 58 of the merging pipe 43 are connected to each of the pair of fixed stays 105 via the pair of connecting stays 34. By adopting such a configuration, the length of the pair of connecting stays 34 can be shortened as compared with a case where the pair of fixed pieces 55, 58 of the merging pipe 43 are fixed to each of the first and second cylinder banks 8, 9 via the pair of connecting stays 34 (See FIG. 6).

Figure 6:
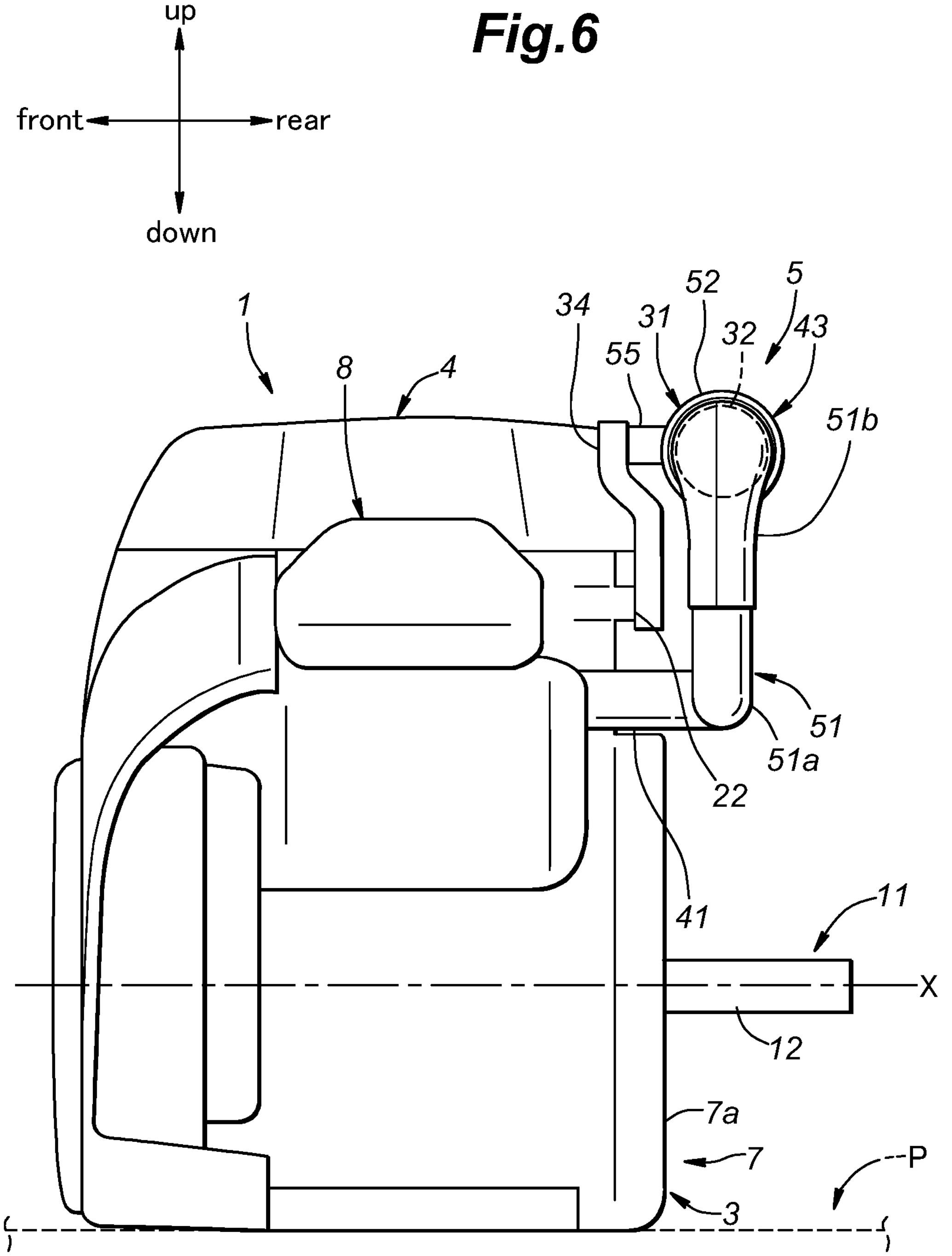
FIG. 6 is a side view showing a V-type engine according to another embodiment of the present invention.

As shown in FIG. 6, in another embodiment, the pair of fixed pieces 55, 58 of the merging pipe 43 may be fixed to each of the first and second cylinder banks 8, 9 via the pair of connecting stays 34. By adopting such a configuration, the merging pipe 43 can be fixed to the first and second cylinder banks 8, 9 without using a configuration (i.e., the pair of fixed stay 105) for fixing the muffler 33. Accordingly, the muffler 33 can be arranged at any position, and the flexibility for setting the muffler 33 can be further improved.

Further, the muffler body 94 extends in the lateral direction from the upper end side (distal end side) of the first cylinder bank 8 to the upper end side (distal end side) of the second cylinder bank 9. By adopting such a configuration, the muffler body 94 is arranged parallel to the catalyst 32, so that the engine body 3, the catalyst 32, and the muffler 33 can be arranged compactly.

Further, the PTO shaft 12 protrudes from the rear surface 7*a* of the crankcase 7, and the catalyst 32 protrudes more rearward than the rear surface 7*a* of the crankcase 7. By adopting such a configuration, the catalyst 32 can protrude in the same direction as the PTO shaft 12. Accordingly, the layout of other parts is less likely to be restricted by the catalyst 32.

Concrete embodiments of the present invention have been described in the foregoing, but the present invention should not be limited by the foregoing embodiments and various modifications and alterations are possible. That is, the positions, orientations, or the like of the components of the exhaust device 5 can be freely changed according to the configuration of the work machine P (for example, a generator, a welder, a lawn mower, a cultivator, or the like) on which the engine 1 is mounted. Accordingly, the position and exhaust direction of the muffler 33 are also not limited by the foregoing embodiments, and can be freely set within the scope of the present invention. For example, when the work machine P provided with the engine 1 is used in an orchard, the position and exhaust direction of the muffler 33 may be set such that the exhaust gas discharged from the muffler 33 does not hit against the fruit trees.

GLOSSARY OF TERMS

1: a V-type engine
3: an engine body
7: a crankcase
7*a*: a rear surface of the crankcase (an example of a side surface)
8: a first cylinder bank
9: a second cylinder bank
11: a crankshaft
12: a PTO shaft (an example of an output portion)
31: an exhaust collecting pipe
32: a catalyst
33: a muffler
34: a connecting stay
41: a first exhaust pipe
42: a second exhaust pipe
43: a merging pipe
51: an inlet pipe
51*a*: an upstream portion of the inlet pipe
51*b*: a downstream portion of the inlet pipe
52: an accommodating pipe
53: an outlet pipe
53*a*: an upstream portion of the outlet pipe

53*b*: a downstream portion of the outlet pipe
94: a muffler body
105: a fixed stay
111: a first muffling chamber
112: a second muffling chamber
113: a third muffling chamber
M: a merging portion
P: a work machine

What is claimed is:

1. A V-type engine, comprising:
an engine body including
a crankcase configured to rotatably support a crankshaft, and
a first and second cylinder banks extending from the crankcase;
an exhaust collecting pipe connected to the first and second cylinder banks;
a catalyst accommodated in the exhaust collecting pipe; and
a muffler detachably connected to the exhaust collecting pipe,
wherein the catalyst extends in a width direction of the engine body from a distal end side of the first cylinder bank to a distal end side of the second cylinder bank,
wherein the exhaust collecting pipe includes:
a first exhaust pipe connected to the first cylinder bank;
a second exhaust pipe connected to the second cylinder bank; and
a merging pipe connected to a merging portion of the first and second exhaust pipes, and
the catalyst is accommodated in the merging pipe,
wherein the merging pipe includes:
an inlet pipe connected to the merging portion of the first and second exhaust pipes on a lateral side of the first cylinder bank and extending so as to protrude outward in the width direction of the engine body; and
an accommodating pipe connected to the inlet pipe on the distal end side of the first cylinder bank and extending in the width direction of the engine body from the distal end side of the first cylinder bank to the distal end side of the second cylinder bank, and
the catalyst is accommodated in the accommodating pipe.

2. The V-type engine according to claim 1, wherein an upstream portion in an exhaust direction of the inlet pipe is formed of a pipe having an undivided structure, and
a downstream portion in the exhaust direction of the inlet pipe is formed of a pipe having a divided structure.

3. The V-type engine according to claim 1, wherein the merging pipe further includes an outlet pipe connected to the accommodating pipe on the distal end side of the second cylinder bank and extending so as to protrude outward in the width direction of the engine body and toward an opposite side of the inlet pipe, and
the muffler is detachably connected to the outlet pipe.

4. The V-type engine according to claim 3, wherein an upstream portion in an exhaust direction of the outlet pipe is formed of a pipe having a divided structure, and
a downstream portion in the exhaust direction of the outlet pipe is formed of a pipe having an undivided structure.

5. The V-type engine according to claim 1, wherein the merging pipe is fixed to each of the first and second cylinder banks via a pair of connecting stays.

6. The V-type engine according to claim 1, wherein an output portion of the crankshaft protrudes from a side surface of the crankcase, and
the catalyst protrudes more sideward than the side surface of the crankcase.

7. A work machine comprising the V-type engine according to claim 1.

8. A V-type engine, comprising:
an engine body including
a crankcase configured to rotatably support a crankshaft, and
a first and second cylinder banks extending from the crankcase;
an exhaust collecting pipe connected to the first and second cylinder banks;
a catalyst accommodated in the exhaust collecting pipe; and
a muffler detachably connected to the exhaust collecting pipe,
wherein the catalyst extends in a width direction of the engine body from a distal end side of the first cylinder bank to a distal end side of the second cylinder bank,
wherein the exhaust collecting pipe includes:
a first exhaust pipe connected to the first cylinder bank;
a second exhaust pipe connected to the second cylinder bank; and
a merging pipe connected to a merging portion of the first and second exhaust pipes, and
the catalyst is accommodated in the merging pipe,
wherein the muffler is fixed to each of the first and second cylinder banks via a pair of fixed stays, and
the merging pipe is connected to each of the pair of fixed stays via a pair of connecting stays.

9. A V-type engine, comprising:
an engine body including
a crankcase configured to rotatably support a crankshaft, and
a first and second cylinder banks extending from the crankcase;
an exhaust collecting pipe connected to the first and second cylinder banks;
a catalyst accommodated in the exhaust collecting pipe; and
a muffler detachably connected to the exhaust collecting pipe,
wherein the catalyst extends in a width direction of the engine body from a distal end side of the first cylinder bank to a distal end side of the second cylinder bank,
wherein the muffler includes a muffler body having a muffling chamber, and
the muffler body extends in the width direction of the engine body from the distal end side of the first cylinder bank to the distal end side of the second cylinder bank.

* * * * *